United States Patent [19]
Shibata et al.

[11] 3,926,918
[45] Dec. 16, 1975

[54] PROCESS FOR PRODUCING POLYVINYL ACETAL

[75] Inventors: Yutaka Shibata; Yoshiaki Kodera; Mitsuru Tanaka, all of Shiga; Fumio Kamiyama, Ohyamazaki; Nakatan, Ohtsu, all of Japan

[73] Assignee: Sekisui Kagaku Kogyo Kabushiki Kaisha, Osaka, Japan

[22] Filed: Dec. 27, 1973

[21] Appl. No.: 428,741

[30] Foreign Application Priority Data
Dec. 30, 1972 Japan.................................. 48-2815

[52] U.S. Cl............................................... 260/73 L
[51] Int. Cl.$^2$......................................... C08F 8/28
[58] Field of Search ................................. 260/73 L

[56] References Cited
UNITED STATES PATENTS

| | | | |
|---|---|---|---|
| 2,430,065 | 11/1947 | Leach........................... | 260/73 L X |
| 2,561,458 | 7/1951 | Bisch............................. | 260/73 L |
| 2,652,387 | 9/1953 | Gruber et al..................... | 260/73 L |

FOREIGN PATENTS OR APPLICATIONS

| | | | |
|---|---|---|---|
| 1,192,628 | 10/1959 | France ........................... | 260/73 L |

Primary Examiner—Lucille M. Phynes
Attorney, Agent, or Firm—Wenderoth, Lind & Ponack

[57] ABSTRACT

A process for preparing polyvinyl acetals by condensing polyvinyl alcohol with an aldehyde in the aqueous phase in the presence of an acid catalyst, wherein after the reaction system is maintained at a temperature of not more than 20°C. to precipitate the reaction product, the reaction system is heated to a temperature of at least 30°C. and the reaction is continued at this temperature.

13 Claims, No Drawings

PROCESS FOR PRODUCING POLYVINYL ACETAL

This invention relates to a process for producing polyvinyl acetals having superior solubility, transparency and moldability or processability.

The polyvinyl acetals find utility in a wide range of applications such as a paint, an interlayer of safety glass, an adhesive, or a resin foam, and are produced by acetalizing polyvinyl alcohol. Among the known methods for acetalization are the dissolving method, the precipitation method, and the homogeneous system method. Although the homogeneous system method is preferred in order to obtain polyvinyl acetals of homogeneous composition and good quality, this method is unfeasible because of one or more disadvantages of which the cost of production is of prime concern.

Generally, the precipitation method is considered better for ease of purification of the product after reaction, and the dissolving method, for the uniformity of acetalization.

The precipitation method comprises adding an aldehyde to an aqueous solution of polyvinyl alcohol and performing the acetalization using an acid or an acidic salt as a catalyst, precipitating the polyvinyl acetal, and aging it by stirring for several hours, neutralizing it, and then filtering, water washing and drying the precipitate. Since a powdery product can be obtained from the aqueous solution in a single process, and the product can be obtained by merely separating the precipitated polyvinyl acetal from the solution after the reaction, this method is simpler in the steps involved and lower in the cost of production than the dissolving method involving complicated steps. However, in the precipitation method, a product of a low degree of acetalization precipitates in the early stage of the reaction, and then, a heterogeneous reaction proceeds between this precipitate and the aldehyde in the reaction mixture to cause the distribution of acetalization of the resulting polyvinyl acetal to tend to be non-uniform. As a result, the product obtained tends to be inferior in solubility, transparency and moldability or processability as compared with those obtained by the dissolving method. If this problem can be overcome, the precipitation method will become a very superior method of producing polyvinyl acetals from polyvinyl alcohol.

Improvements of this precipitation method which have hitherto been made include a method wherein a surface active agent is added to increase the hydrophilicity of the interface of the precipitate thereby to improve the solubility or transparency, or a method wherein a water-soluble polymeric substance is added to an aqueous solution of polyvinyl alcohol and the aldehyde is added, thereby to increase the solubility of the product. These methods, however, require a complete removal of the additives such as the surfactant or water-soluble polymeric substance. Especially when the resultant resin is intended for use as an interlayer of safety glass, the resin is desirably free from cloud, and therefore, the step of removing the additives becomes troublesome. Furthermore, with these methods, it is difficult to ensure good quality of the product.

It is an object of this invention to provide a process which eliminates the defects of the conventional precipitation method, and in which polyvinyl acetals in the form of fine particles having good solubility, transparency and moldability are precipitated from an aqueous solution of polyvinyl alcohol without using any additive for improving the quality of the product.

According to this invention, there is provided a process for preparing polyvinyl acetals by condensing polyvinyl alcohol with an aldehyde in the aqueous phase in the presence of an acid catalyst, wherein after the reaction system is maintained at a temperature of not more than 20°C. to precipitate the reaction product, the reaction system is further heated at a temperature of 30°C. or more and the reaction is continued at this temperature.

The degree of polymerization of the polyvinyl alcohol used in this invention is not particularly limited, but generally those having a degree of polymerization of 200 to 3000 can be conveniently used. Furthermore, the polyvinyl alcohol may contain a residual acyl group (R—CO—) and generally, those containing not more than 10 mol% of the residual acyl group are used.

The concentration of the polyvinyl alcohol aqueous solution used in this invention may be one at which the acetalization reaction can be performed, and generally, the concentration of the polyvinyl alcohol in the aqueous solution is 5 to 20 % by weight. If the concentration is less than 5 %, there is no practical value. On the other hand, if it exceeds 20 %, the viscosity of the solution becomes too high to obtain the precipitate in the form of fine particles or powder with ease.

The acid catalyst used in this invention may be those known to have an action of inducing the condensation of polyvinyl alcohol with an aldehyde. Suitable acid catalyst are for example hydrochloric acid, sulfuric acid, and nitric acid. The amount of the acid catalyst usually used is 1 to 5 % by weight based on the fixed reaction mixture. If the amount is less than 1 % by weight, a sufficiently feasible rate of reaction cannot be obtained, and if it is more than 5 % by weight, the rate of reaction becomes exceedingly high, and the acetalization distribution of the resulting polyvinyl acetal becomes non-uniform. Furthermore, the elimination of the acid in subsequent steps becomes difficult.

The acid catalyst may be added either at a time or in portions.

The aldehyde to be condensed with the polyvinyl alcohol in accordance with the process of this invention may, for example, be butyraldehyde, acetaldehyde, formaldehyde, and other known aldehydes, which are used either alone or in combination. The type and amount of the aldehyde used is determined according to the end use of the polyvinyl acetal product. Usually, however, the aldehyde is used in an amount of 0.25 to 1.0 mol per 1.0 mol of the —$CH_2$—CHOH— bond of the polyvinyl alcohol. By specifying the amount of the aldehyde as above, the polyvinyl acetal obtained has a degree of acetalization of 50 to 80 mol % which is suitable for the end uses.

One example of the production of polyvinyl acetal in accordance with the process of this invention involves adding an aldehyde to an aqueous solution of polyvinyl alcohol containing an acid catalyst to allow the polyvinyl alcohol and the aldehyde to react in the aqueous phase in the presence of an acid catalyst. This condensation reaction yields a precipitate. At this time, the temperature of the reaction system is maintained at 20°C. or below in order to obtain the precipitate in the form of fine particles or powder. If the precipitation of the reaction product is performed at a temperature of above 20°C., the precipitate is in the form of coarse particles, and at times, the particles become an agglomerated mass to render the subsequent acetalization reaction non-uniform and the purification of the resin difficult.

In the present invention, the reaction system may be maintained at not more than 20°C. from the initial stage of reaction to the precipitation of the precipitate; alternatively, the temperature may be maintained at a point higher than 20°C. in the early stage of the reaction, and then at a stage of precipitation, lowered to below 20°C. Preferably, the temperature is maintained above 20°C. at the initial stage of the reaction, and at this stage, a small amount of an aldehyde is added to form polyvinyl acetal having a low degree of acetalization; and then, the temperature is lowered to below 20°C. and an addition amount of the aldehyde is added to precipitate the polyvinyl acetal.

In this preferred embodiment, the amount of the aldehyde added while the temperature is maintained at a point above 20°C. is not more than 0.25 mol per 1.0 mol of the —$CH_2$—CHOH— bond of the polyvinyl alcohol. If the amount of the aldehyde is larger at this stage, the precipitation occurs at a temperature above 20°C.

By maintaining the temperature at the initial stage of the reaction at a point higher than 20°C., the rise of the viscosity of the polyvinyl alcohol aqueous solution can be inhibited and the possible gellation of the reaction system can be avoided. Furthermore, non-uniform acetalization which tends to occur at the initial stage of acetalization at low temperatures can be avoided.

In the present invention, the temperature of the reaction system at the time of precipitation of polyvinyl acetal is adjusted to not more than 20°C., and the lower limit of this temperature may be one at which the reaction system is not frozen. Usually, the lower limit of this temperature is —6°C.

After the precipitation as described above, the reaction system is heated to at least 30°C., and the reaction is further carried out at this temperature to perform aging. Then, the reaction product is washed and purified in accordance with customary procedures.

If the reaction is continued at a temperature of not more than 20°C. after precipitation of reaction product, and no step is taken to raise the temperature beyond 30°C., the acetalization distribution of the resultant polyvinyl acetal becomes non-uniform, and the rate of the acetalization is low. This leads to the failure of yielding the polyvinyl acetal resin of good quality intended by the present invention.

Preferably, the time during which the reaction system is maintained at a temperature of not more than 20°C. is as short as possible within a period of 3 hours, and it is recommended that the rate of temperature elevation from this low temperature range should be 5° to 20°C. per hour. If the rate of temperature elevation is less than 5°C. per hour, the time during which the reaction system is maintained at the low temperatures becomes too long, it is difficult to ensure a uniform acetalization distribution. On the other hand, if the rate of temperature elevation exceeds 20°C. per hour, the precipitated particles are not sufficiently stabilized and may possibly become coarse or agglomerated into a mass.

The upper limit of the temperature after temperature elevation is not particularly determined, but generally, it is 60°C. The aging time is neither specifically determined, but naturally, it is 1 to 10 hours.

If the temperature of the reaction system after temperature elevation is lower than 30°C., the resulting resin does not have a uniform distribution of acetalization.

By providing the aging period during which the reaction temperature is maintained at at least 30°C., there can be obtained a product having superior properties such as solubility, transparency and moldability to those obtained by performing the precipitation at a temperature of not more than 20°C. and continuing the reaction without temperature elevation, or while elevating the temperature to below 30°C.

It has been found for the first time by the present invention that polyvinyl acetal having superior properties can be obtained by precipitating the reaction product at a temperature of not more than 20°C., and then maintaining the reaction temperature at a temperature of at least 30°C. to perform the aging of the reaction system.

The reason for this is not fully clear, but is presumed to be the following. In the manufacture of polyvinyl acetals by the precipitation method, the reaction product must be precipitated at a relatively low temperature of not more than 20°C. if it is desired to be obtained in the form of fine particles. However, the reaction of the polyvinyl acetal with the aldehyde in the reaction mixture after precipitation is a reaction in a heterogeneous system, and at a low temperature, the rate of acetalization reaction is low. Furthermore, association of the residual hydroxyl groups, especially the mutual interaction of the wide ranged part of a chain having thick distributed residual hydroxyl groups, is prone to occur, and when such association occurs, the subsequent acetalization reaction tends to take place selectively at the non-associated portion of the molecules, which results in the remaining of an assembly of the residual hydroxyl group parts within the molecules of the final product. Furthermore, the above association causes the tendency of forming an intermolecular acetal linkage, and adversely affects the various properties of the final product, such as solubility, transparency or melt viscosity. When the temperature of the reaction system is raised to above 30°C. after the precipitation, the rate of the acetalization reaction increases and the abovementioned association of the residual hydroxyl groups of polyvinyl alcohol is prevented. As a result, the acetalization reaction takes place not exclusively within the molecules, but at random positions to form polyvinyl acetal which is also molecularly uniform. Furthermore, by aging the reaction system at a relatively high temperature of at least 30°C., the acetalization reaction rapidly reaches an equilibrium, and in the repetition of acetalization and deacetalization in this equilibrium state, isotactic acetalization of higher stability proceeds and the intermolecular acetal linkage is reduced. By an over-all action of these, polyvinyl acetal of superior solubility, transparency and modability would be obtained. While in the conventional method, an excess of an aldehyde must be used to obtain a product of the desired degree of acetalization, the use of such an excessive aldehyde is not required in the present invention because the reaction system is aged at a relatively high temperature. For example, when it is is desired to obtain polyvinyl acetal having a degree of acetalization of 60 to 70 mol % in accordance with the conventional method, an about 10–15 % excess of aldehyde is required. However, in accordance with the present invention, the use of aldehyde in an excess of less than about 1 % is sufficient in order to obtain a polyvinyl acetal having a degree of acetalization of not more than 65 mol %, for the acetalzation degree of not more than 70 mol %, less than about 5 % excess is sufficient. Thus, according to this invention, the amount of the starting aldehyde can be small, and therefore, the subsequent treatments such as neutralization or washing becomes easy, leading to the improvement or stabilization of the quality of the product.

When the polyvinyl acetal produced by the method of this invention is compared with the polyvinyl acetal produced by the conventional precipitation method by means of infrared absorption spectrum, they are apparently different in the absorption band of the residual hydroxyl group. In the product of this invention, the absorption band of hydroxyl group is very sharp and has a peak at 3450 to 3500 cm$^{-1}$, and there is no bulge in the lower wave number area. On the other hand, in the product according to the conventional method, the absorption band of hydroxyl group is broad and has a bulge in the lower wave number region of 3200 to 3300 cm$^{-1}$. This demonstrate that in the resin obtained by the conventional mthod, a partial assemblage of the residual hydroxyl groups exists within the molecules.

The above description shows that in accordance with the process of this invention, polyvinyl acetals having superior solubility, transparency and moldability can be produced in the form of fine particles with commercial advantage, and that the amount of the aldehyde to be used can be small. Moreover, since the amount of the aldehyde remaining in the final reaction system is small, the neutralization of the reaction mixture or the washing of the product is easy, and these advantages favor the quality of the final product.

The following Examples illustrate the present invention.

EXAMPLE 1

Concentrated hydrochloric acid (65 g) was added to 1,000 g of a 10 % aqueous solution of polyvinyl alcohol having a degree of polymerization of about 1700 and containing 1.0 mol % of residual acetyl groups. The solution was maintained at 30°C., and with stirring, 15 g of butyraldehyde was added. No precipitation occurred at this stage. The mixture was then cooled to 15°C., and with stirring 40 g of butyraldehyde was further added to precipitate white fine particles of polyvinylbutyral. The reaction system was maintained at 15°C. for 10 minutes, and then heated to 40°C. at a rate of 15°C. per hour. The reaction system was maintained at this temperature for 4 hours, and then the reaction product was purified by a customary method. The polyvinyl butyral so obtained was in the form of fine particles with a degree of butyralization of 65 mol % and having a white color. This product was found to be well soluble in alcohols such as methanol, ethanol or butanol, ketones such as acetone, or methyl ethyl ketone, esters such as methyl acetate, or ethyl acetate, methyl cellosolve, butyl cellosolve, and chloroform, and swellable with toluene or xylene. The butyraldehyde added was completely consumed by the butyralization reaction, and no aldehyde remained in the reaction mixture.

COMPARATIVE EXAMPLE 1

Polyvinyl butyral was prepared in the same way as in Example 1 except that 62 g in total of butyraldehyde was used and the reaction was performed for 10 hours at 15°C. without temperature elevation. The resulting polyvinyl butyral had a degree of butyralization of 66 mol %. At this time, 13 % of the butyraldehyde added remained unreacted. The polyvinyl butyral obtained was found to be soluble in the alcohols or methyl cellosolve, but insoluble in ethyl acetate or methyl ethyl ketone. As regards the other solvents, there was an apparent difference in solubility from the product obtained in Example 1.

The viscosity and transparency of the products obtained in Example 1 and Comparative Example 1 were compared, and the results are tabulated below. It is seen from the table that the product in accordance with this invention has a lower viscosity and a better transparency.

|  | Viscosity (cps) | Transparency (cm) |
|---|---|---|
| Example 1 | 70 | 70 |
| Comparative Example 1 | 210 | 30 |

The viscosity was measured by means of rotary viscometer on a 5 % solution of the sample in a 1:1 mixture of ethanol and toluene at 20°C. The transparency was measured as follows: Paper printed with No. 5 types was submerged in a 5 % solution of a 1:1 mixture of ethanol and toluene until the printed letters on the paper became illegible. Then, the distance from the surface of the solution to the paper surface was measured, and made a measure of the transparency.

When the softening points of the above products were compared until a Koka-type flow tester (product of Shimazu Seisakusho), it was found that the product in accordance with this invention had a softening point of 195°C., while that in accordance with Comparative Example 1 had a softening point of 217°C. That the softening point is lower means better moldability or processability. The measuring conditions for the Kota-flow tester were as follows:

| | |
|---|---|
| Amount of the sample: | 1.5 g |
| Preheating conditions: | 130°C., 5 minutes, no load |
| Diameter of the nozzle: | 1 mm |
| Load: | 100 Kg/cm$^2$ |
| Rate of temperature elevation: | 6°C./min. |
| Softening point: | The temperature at which the flow rate became 10$^{-3}$ cc/sec. |

EXAMPLE 2

Concentrated hydrochloric acid (65 g) was added to 1000 g of a 10 % aqueous solution of polyvinyl alcohol having a degree of polymerization of about 1000 and containing 1.5 mol % of residual acetyl groups, and with stirring at 25°C., 15 g of butyraldehyde was added to perform a first-stage reaction. The reaction mixture was cooled to 5°C., and with stirring, 42 g of butyraldehyde was further added, whereupon polyvinyl butyral in the form of fine particles assuming a white color was precipitated. The reaction mixture was maintained at 5°C. for 1 hour, and then heated to 40°C. at a rate of 10°C. per hour. The reaction mixture was then aged by being maintained at 40°C. for 3 hours. The reaction product obtained was purified by a customary procedure. The polyvinyl butyral obtained was a white fine powder having a degree of butyralization of 67 mol %. Two percent of the butyraldehyde added remained unreacted. The resultant polyvinyl butyral was found to be well soluble in alcohols such as methanol, ethanol or butanol, ketones such as acetone and methyl ethyl ketone, esters such as methyl acetate, ethyl acetate and butyl acetate, chloroform, and methyl cellosolve.

COMPARATIVE EXAMPLE 2

Polyvinyl butyral having a degree of butyralization of 67 mol % was prepared in the same way as in Example 2 except that the amount of butyraldehyde to be added at 5°C. was changed to 49 g, and the reaction was performed for 15 hours at 5°C. without temperature elevation to 40°C. At this time, 15 % of the butyraldehyde added remained unreacted. The resulting polyvinyl butyral was soluble in the alcohols, ketones, chloroform, and methyl cellosolve, but was only swelled with the ethyl acetate and butyl acetate.

The viscosity and transparency of the products obtained in Example 2 and Comparative Example 2 were measured in the same way as set forth in Comparative Example 1 except that the concentration of the solution was changed to 10 %.

The results are tabulated below.

|  | Viscosity (cps) | Transparency (cm) |
| --- | --- | --- |
| Example 2 | 60 | 80 |
| Comparative Example 2 | 140 | 35 |

EXAMPLE 3

Concentrated hydrochloric acid (70 g) was added to 1000 g of a 10 % aqueous solution of the same polyvinyl alcohol as used in Example 1, and the solution was maintained at 40°C. With stirring, 30 g of a 37 % aqueous solution of formaldehyde was added to perform a firststage reaction. No precipitation occurred at this stage. The reaction mixture was then cooled to 10°C., and with stirring, 50 g of butyraldehyde was added, whereupon butyral-formal mixed polyvinyl acetal in the form of fine particle of white color was precipitated. The reaction mixture was maintained at 10°C. for 30 minutes, and then heated to 50°C. at a rate of 15°C. per hour. The reaction mixture was aged by being maintained at this temperature for 2.5 hours. The reaction product was purified by a customary procedure. The resulting mixed acetalized product was a white powder having a total degree of acetalization of 70 mol %.

COMPARATIVE EXAMPLE 3

Butyral-formal mixed acetalized product in the form of a white powder having a degree of acetalization of 69 mol % was prepared in the same way as in Example 3 except that the amount of the butyraldehyde to be added at 10°C. was changed to 55 g, and the reaction was performed at 10°C. for 10 hours without temperature elevation.

The viscosity and transparency of the products obtained in Example 3 and Comparative Example 3 were measured in the same way as set forth in Comparative Example 1. The results are tabulated below.

|  | Viscosity (cps) | Transparency (cm) |
| --- | --- | --- |
| Example 3 | 80 | 70 |
| Comparative Example 3 | 120 | 45 |

EXAMPLE 4

Concentrated hydrochloric acid (65 g) was added to 1000 g of a 10 % aqueous solution of the same polyvinyl alcohol as used in Example 1, and the solution was maintained at 30°C. With stirring, 28 g of para-aldehyde (a trimer of acetaldehyde) was added to perform a first-stage reaction. No precipitation occurred at this stage. The reaction mixture was then cooled to 15°C., and with stirring, 37 g of butyraldehyde was added, whereupon butyral-acetal mixed polyvinyl acetal in the form of fine particles of white color was precipitated. The reaction mixture was maintained at 15°C. for 15 minutes, and then heated to 45°C. at a rate of 15°C. per hour. The mixture was aged by being maintained at this temperature for 2 hours. The reaction product was separated and purified by a customary procedure. The resulting mixed acetalized product was a white powder having a total degree of acetalization of 69 mol %.

COMPARATIVE EXAMPLE 4

Butyral-acetal mixed acetalized product in the form of a white powder having a total acetalization degree of 67 mol % was prepared in the same way as in Example 4 except that the amount of the butyraldehyde to be added 15°C. was changed to 40 g, and the reaction was performed at 15°C. for 8 hours without temperature elevation.

The viscosity and transparency of the products obtained in Example 4 and Comparative Example 4 were measured in the same way as set forth in Comparative Example 1. The results are tabulated below.

|  | Viscosity (cps) | Transparency (cm) |
| --- | --- | --- |
| Example 4 | 75 | 70 |
| Comparative Example 4 | 125 | 35 |

EXAMPLE 5

The dissolving speed of each of the polyvinyl acetals obtained in Examples 1 to 4 above was measured using a 1:1 mixture of ethanol and toluene. The measuring procedure was as follows: A 300 cc triangular flask was charged with 190 g of the mixed solvent, and then 10 g of the sample. The contents were maintained at 20°C., and shaken by a shaker. The time required until the sample was dissolved in the solvent was measured. The results are given in the following table.

|  | Dissolving time (minutes) |
| --- | --- |
| Example 1 | 60 |
| Comparative Example 1 | 180 |
| Example 2 | 12 |
| Comparative Example 2 | 30 |
| Example 3 | 100 |

| | Dissolving time (minutes) |
|---|---|
| Comparative Example 3 | 140 |
| Example 4 | 70 |
| Comparative Example 4 | 130 |

What we claim is:

1. A process for preparing polyvinyl acetals by condensing polyvinyl alcohol with an aldehyde in the aqueous phase in the presence of a catalytic amount of an acid catalyst which comprises the following steps:
   1. reacting the polyvinyl alcohol with not more than 0.25 mol per 1.0 mol of the —$CH_2$—CHOH— bond of the polyvinyl alcohol, of an aldehyde at a temperature in excess of 20°C. so as not to precipitate the reaction product,
   2. cooling the reaction system at a temperature of not more than 20°C. and further adding an aldehyde while maintaining the reaction system at a temperature of not more than 20°C. thereby to precipitate the reaction product, and
   3. heating the reaction system to a temperature of at least 30°C. and continuing the reaction at this temperature for at least 1 hour.

2. The process of claim 1 wherein the time during which the reaction system is maintained at a temperature of not more than 20°C. is not more than 3 hours.

3. The process of claim 1 wherein the reaction system after the precipitation is heated at a rate of 5° to 20°C. per hour.

4. The process of claim 1 wherein the reaction system is maintained at a temperature of not more than 20°C. but above —6°C. to precipitate the reaction product.

5. The process of claim 1 wherein the reaction system is heated to a tempeature of 30° to 60°C., and the reaction is continued at this temperature.

6. The process of claim 1 wherein said acid catalyst is hydrochloric acid.

7. The process of claim 1 wherein the polyvinyl alcohol has a degree of polymerization of 200 to 3000 and contains not more than 10 mol % of residual acyl groups.

8. The process of claim 1 wherein the concentration of the aqueous solution of polyvinyl alcohol is 5 to 20 % by weight.

9. The process of claim 1 wherein the aldehyde is butyraldehyde.

10. The process of claim 1 wherein the aldehyde is a combination of butyraldehyde and acetaldehyde.

11. The process of claim 1 wherein the aldehyde is a combination of butyraldehyde and formaldehyde.

12. The process of claim 1 wherein the amount of the aldehyde is 0.25 to 1.0 mol per 1.0 mol of the —$CH_2$—CHOH— bond of the polyvinyl alcohol.

13. A process for preparing polyvinyl acetals by condensing polyvinyl alcohol with an aldehyde in the aqueous phase in the presence of a catalytic amount of an acid catalyst, which comprises reacting the polyvinyl alcohol with not more than 0.25 mol per 1.0 mol of the —$CH_2$—CHOH— bond of the polyvinyl alcohol, of an aldehyde at a temperature in excess of 20°C. so as not to precipitate the reaction product, then maintaining the reaction system at a temperature of not more than 20°C., further adding an aldehyde to precipitate the reaction product, maintaining the reaction system within 3 hours at a temperature of not more than 20°C., then heating the reaction system at a rate of 5° to 20°C. per hour to a temperature of 30° to 60°C., and continuing the reaction at this temperature for at least 1 hour.

* * * * *